C. A. WEST.
AUTOMOBILE FENDER.
APPLICATION FILED JUNE 22, 1917.

1,264,723.

Patented Apr. 30, 1918.

Witnesses

C. A. West, Inventor

By R. Swift & Co.
Attorneys

UNITED STATES PATENT OFFICE.

CARL ALBERT WEST, OF SOMERVILLE, MASSACHUSETTS.

AUTOMOBILE-FENDER.

1,264,723.  Specification of Letters Patent.  Patented Apr. 30, 1918.

Application filed June 22, 1917. Serial No. 176,342.

*To all whom it may concern:*

Be it known that I, CARL A. WEST, a citizen of the United States, residing at Somerville, in the county of Middlesex, State of Massachusetts, have invented a new and useful Automobile-Fender; and I do hereby declare the following to be a full, clear, and exact description of the invention, such as will enable others skilled in the art to which it appertains to make and use the same.

This invention relates to the art of fenders for cars, and particularly to an improved fender more especially adapted for use in connection with automobiles.

One of the objects of the invention is to provide a fender that may be attached easily to any make of automobile, either to a self or crank starting automobile, and should it be a crank starting kind, the fender has sufficient resiliency to permit the same to be raised, whereby the crank may be easily manipulated.

A further object of the invention is to provide a fender, which may be raised, collapsed or folded at any time when desired, preferably when passing over bad or rough roads, and when lowered while passing over streets, it will serve an excellent purpose of preventing accidents.

A further object of the invention is the provision of a fender which will bear down toward the road bed, incident to the weight of pedestrian on the fender. In other words, the fender will yield, owing to its flexibility, incident to the weight of a person thereon, and when the weight is removed, the fender will assume its normal position and shape.

A further object of the invention is the provision of a fender which is yieldable and has its side ends constructed of flexible spring material and designed to yield, whereby said ends will act as brake bands on the front wheels of the automobile, when the fender is depressed downwardly.

A further object of the invention is the provision of a fender so constructed and yieldable, that when one end or the other comes in contact with a pedestrian or person on the street, the person will be thrown to the side of the road.

In practical fields, the details of construction may necessitate alterations falling within the scope of what is claimed.

The invention comprises further features and combination of parts, as hereinafter set forth, shown in the drawings and claimed.

In the drawings:—

Figure 1:
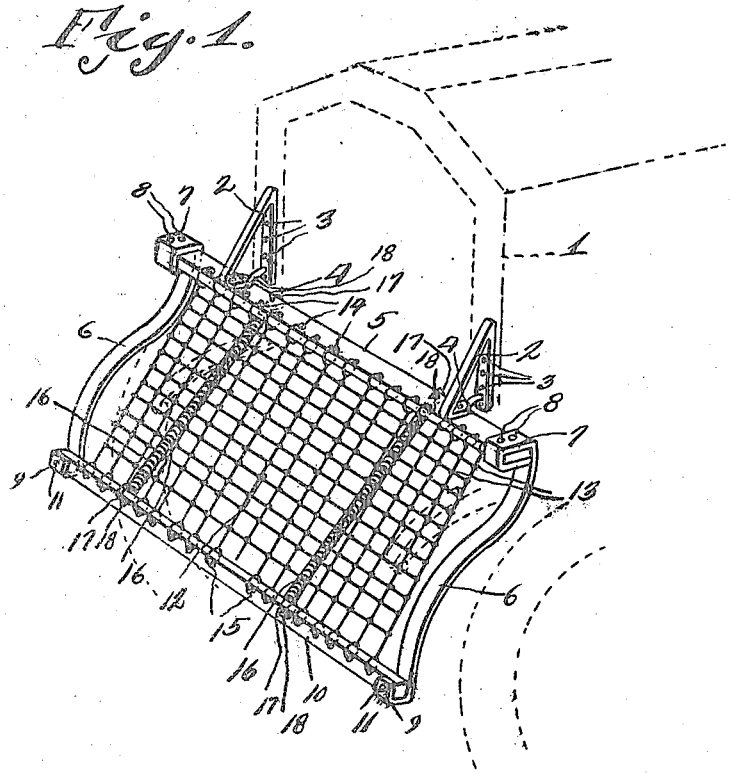
Figure 1 is a view in perspective of a portion of an automobile (which is shown in dotted line) showing the fender applied thereto.
Figure 2:
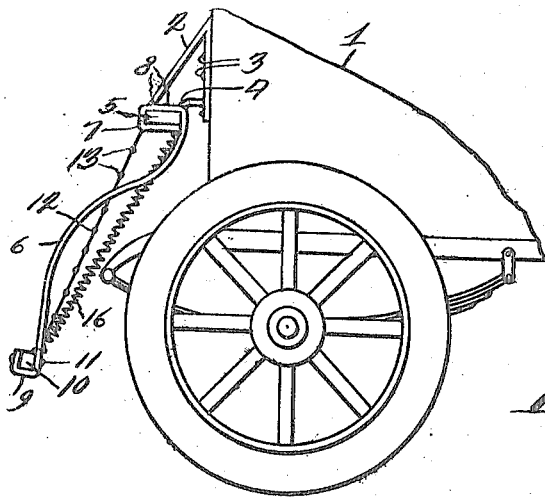
Fig. 2 is a view in side elevation of the front part of an automobile, showing the fender as applied.

Referring more especially to the drawings, 1 designates the hood of an automobile to the front side portions of which, adjacent the radiator, substantially triangular shaped brackets 2 are secured, as shown at 3. Secured to the horizontal portions 4 of said brackets, and disposed transversely of the front of the radiator, is a metallic bar or strip 5 which forms the upper rail of the fender. The side ends of the fender comprise the spring or yieldable strips 6, the upper ends of which terminate in loops 7 to receive and fit the ends of the bar or member 5, there being suitable bolts 8 to secure said loops to the bar. The lower ends of the yieldable strips terminate in U-shaped portions 9 in which the ends of a lower bar 10 of the fender are secured by the bolts 11. The frame of the fender, as above set forth, is designed to have stretched thereover a network of heavy rope 12 or canvas, and this network inclines forwardly and downwardly from the bar 5 to the bar 10, and the forwardly and downwardly inclined strands of the network are knotted to the transverse strands, as shown at 13, and the upper and lower ends of said forwardly and downwardly inclined strands are looped in apertures 14 and 15 of the upper and lower bars 5 and 10 respectively, thereby securely fastening the network to the fender. It is to be observed that the end strips 6 of the fender are constructed of yieldable spring material and are so curved as to substantially conform to and designed to engage the front wheels of the automobile, thereby acting as brake shoes. Connecting the upper and lower bars 5 and 10, are coil springs 16, the attaching loops 17 of which engage eyes 18 of the bars 5 and 10 respectively. The end strips 6 are of sufficient resiliency so that when the strips are curved, as shown in Fig. 1, they have a tendency toward straightening, which will act to draw the network of rope taut. However, the tension of the coil springs 16 is sufficient to partially counteract the straightening tendency of the strips 6, thereby relieving the greater portion of the strain on the network of rope. The springs 16 also act to return the fender to its normal position when pressed downwardly or raised upwardly. However, the end strips 6, which have considerable yieldability, mainly act to restore the fender to its normal position when raised or lowered, and owing to the strips 6 being curved or shaped, as shown, they can be collapsed, so that the bar 10 may be brought upwardly and rearwardly somewhat close to the bar 5. To crank the automobile, the fender may be raised by lifting the lower bar against the action of the coil springs and the yieldable strips 6.

The invention having been set forth, what is claimed as new and useful is:—

1. In a fender for automobiles, a frame comprising upper and lower horizontal bars, end strips having U-shaped lower terminals to receive the ends of the lower bar, and having loops at their upper ends to receive and engage the ends of the upper bar, a network of rope stretched over the frame and connecting the upper and lower bars and being inclined forwardly and downwardly, said end strips being yieldable, and urved, whereby they may act as brake bands or shoes for the front wheels of the automobile, and also act as protecting guards for the network and to stretch the network taut, and coil springs connecting the upper and lower bars, thereby relieving the greater part of the strain on said network.

2. In a fender for automobiles, a pair of brackets secured to the opposite sides of the radiator, a transverse flat bar secured to said brackets, a forwardly disposed lower transverse bar, compound curved leaf spring end pieces, the upper end of each of which is secured to one end of the transverse flat bar, and its lower end being secured to one end of the lower transverse bar, a net work of rope stretched from the upper transverse bar and connected thereto and extending toward and connected to the lower transverse bar, said net work bisecting the center of the end pieces, which are edgewise to the ends of the net work, and coil spring connecting the upper and lower transverse bars.

In testimony whereof I have signed my name to this specification in the presence of two subscribing witnesses.

CARL ALBERT WEST.

Witnesses:
  J. L. MULLANEY,
  L. F. NICHOLS.